US011904377B2

(12) United States Patent
Morrow et al.

(10) Patent No.: US 11,904,377 B2
(45) Date of Patent: Feb. 20, 2024

(54) EMBOSSING SYSTEM

(71) Applicant: Panduit Corp., Tinley Park, IL (US)

(72) Inventors: Russell K. Morrow, Tinley Park, IL (US); Andre' C. Robinson, Loganville, GA (US)

(73) Assignee: Panduit Corp., Tinley Park, IL (US)

(*) Notice: Subject to any disclaimer, the term of this patent is extended or adjusted under 35 U.S.C. 154(b) by 32 days.

(21) Appl. No.: 17/980,760

(22) Filed: Nov. 4, 2022

(65) Prior Publication Data

US 2023/0051282 A1 Feb. 16, 2023

Related U.S. Application Data

(62) Division of application No. 17/158,193, filed on Jan. 26, 2021, now Pat. No. 11,752,539.

(60) Provisional application No. 62/966,250, filed on Jan. 27, 2020.

(51) Int. Cl.
*B41J 3/38* (2006.01)
*B21D 43/11* (2006.01)
*B65H 20/18* (2006.01)

(52) U.S. Cl.
CPC ............... *B21D 43/11* (2013.01); *B41J 3/385* (2013.01); *B65H 20/18* (2013.01)

(58) Field of Classification Search
CPC ........... B21D 43/11; B41J 3/385; B65H 20/18
See application file for complete search history.

(56) References Cited

U.S. PATENT DOCUMENTS

| | | | | |
|---|---|---|---|---|
| 2,528,435 A | | 10/1950 | Isett | |
| 2,973,583 A | | 3/1961 | Stolle et al. | |
| 4,255,073 A | | 3/1981 | Schöttle | |
| 4,441,831 A | | 4/1984 | Tipple et al. | |
| 4,686,898 A | | 8/1987 | LaManna et al. | |
| 4,789,420 A | | 12/1988 | LaManna et al. | |
| 5,177,992 A | * | 1/1993 | Aoki | B30B 15/30 72/422 |
| 5,503,514 A | | 4/1996 | LaManna et al. | |

(Continued)

FOREIGN PATENT DOCUMENTS

| | | | |
|---|---|---|---|
| CN | 115041604 A | * | 9/2022 |
| CN | WO-8501277 A1 | * | 9/2022 |

(Continued)

OTHER PUBLICATIONS

Metal Embossing Plate manufactured by Matica Technologies, specification sheet (2 pgs.); Oct. 2014.

*Primary Examiner* — Christopher E Mahoney
*Assistant Examiner* — Marissa Ferguson-Samreth
(74) *Attorney, Agent, or Firm* — Christopher S. Clancy; James H. Williams; Aimee E. McVady

(57) ABSTRACT

An embossing system designed to mark metal marker plates. The embossing system includes a feeder system that presents a marker plate, a drive sub assembly secured to the feeder system, and a gripper system that grips the marker plate from the feeder system. The feeder system has a fixed side wall secured to a base plate and a moveable side wall positioned a distance from the fixed side wall. Marker plate guides are secured to the side walls for providing support to a stack of marker plates positioned in the feeder system. Adjustable feed gates are secured to the sidewalls to accommodate adjustments for maker plate thickness variations.

9 Claims, 18 Drawing Sheets

(56) References Cited

U.S. PATENT DOCUMENTS

| | | | | |
|---|---|---|---|---|
| 6,167,804 | B1 | 1/2001 | Mucelli | |
| 6,390,461 | B1 * | 5/2002 | Vitko, Jr. | B65H 3/0883 271/99 |
| 6,719,198 | B2 | 4/2004 | Bretl et al. | |
| 6,758,470 | B1 * | 7/2004 | Meier | B65H 3/06 271/167 |
| 6,866,262 | B2 | 3/2005 | Gronau et al. | |
| 7,143,935 | B2 | 12/2006 | Marta | |
| 9,156,638 | B2 | 10/2015 | MacArthur et al. | |
| 9,481,200 | B2 | 11/2016 | Ward et al. | |
| 2017/0028772 | A1 * | 2/2017 | Ward | B44B 5/024 |

FOREIGN PATENT DOCUMENTS

| | | | | |
|---|---|---|---|---|
| DE | 60105348 | T2 * | 9/2005 | B21D 43/006 |
| EP | 0251637 | B1 | 9/1992 | |
| EP | 0462201 | B1 | 7/1996 | |
| EP | 1486336 | B1 | 12/2004 | |
| EP | 1038263 | B1 | 11/2007 | |
| EP | 1991430 | B1 | 11/2008 | |
| EP | 2007592 | B1 | 12/2014 | |
| WO | 9829234 | A2 | 7/1998 | |
| WO | 2007091114 | A1 | 8/2007 | |
| WO | WO-2012172303 | A1 * | 12/2012 | B65C 11/00 |
| WO | 2015071884 | A1 | 5/2015 | |
| WO | 2017021988 | A1 | 2/2017 | |

* cited by examiner

EMBOSSING SYSTEM

CROSS REFERENCE TO RELATED APPLICATION

This application is a divisional of U.S. patent application Ser. No. 17/158,193, filed Jan. 26, 2021 and claims benefit to U.S. Provisional Patent Application No. 62/966,250, filed on Jan. 27, 2020, the entirety of which is hereby incorporated by reference herein.

FIELD OF THE INVENTION

The present invention relates to an embossing system for marker plates, and more particularly to improved feeder and gripper system installed in the embossing system for marker plates.

BACKGROUND OF THE INVENTION

Embossing systems may be used to emboss markings into marker plates typically made of metal. U.S. Pat. No. 9,481,200 is an example embossing system, herein incorporated by reference. The embossing systems typically use a loading device to load stacked marker plates, one at a time, to a delivery device which sequentially delivers each marker plate of the stack to an embossing device. The loading device comprises opposed frame and gate members which hold the stacked marker plates between the frame members. A plate weight is disposed on top of the stacked marker plates. A marker plate moving member moves one marker plate at a time out of the bottom of the stack onto a base surface disposed adjacent to the gate members. Occasionally, the marker plate moving member may misfeed resulting in more than one marker plate being pushed out of the stack onto the base surface, or marker plates becoming stuck between the gate members and the base surface. This may result in the embossing system having to be stopped to reset the loading device. Additionally, the frame members and gate members may be bumped out of alignment due to excessive vibration in the embossing system, or due to the loading of marker plates into the loading device. This may cause the marker plates to scrape against the frame members and the gate members, the marker plates to become lodged between the gate members, more than one marker plate to be pushed out of the stack onto the base surface, or the marker plates to become stuck between gate members and the base surface. Additionally, prior art feeder or loading systems have not been designed to accommodate the smallest and thinnest marker plates that are offered to customers.

It is desirable to provide a feeder system that accommodates a variety of sizes of marker plates, including the smallest and thinnest marker plates available. It is also desirable to provide a feeder system that can adapt to varying width, height, and thickness of the metal marker plates. Further, it is desirable to provide a feeder system that consistently feeds marker plates one unit per cycle while presenting the marker plate precisely to the gripper, so the embossed characters are accurately located on the marker plate.

SUMMARY OF THE INVENTION

An embossing system used to mark metal marker plates. The embossing system includes a feeder system, a drive sub assembly secured to the feeder system, and a gripper system. The feeder system presents the marker plate to gripper system. The feeder system has a fixed side wall secured to a base plate and a moveable side wall positioned a distance from the fixed side wall and extending parallel to the fixed side wall. The feeder system includes guide tracks with guide blocks installed on the base plate adjacent to the fixed side wall. The moveable side wall is installed on the guide blocks and is guided by the guide blocks ensuring the movable side wall remains parallel to the fixed side wall. The feeder system also includes marker plate guides and adjustable feed guides. The marker plate guides are secured to the fixed side wall and the movable side wall to provide support to a stack of marker plates positioned in the feeder system. The adjustable feed gates are secured to the fixed side wall and the moveable sidewall to accommodate adjustments for maker plate thickness variations.

DETAILED DESCRIPTION

Figure 1:
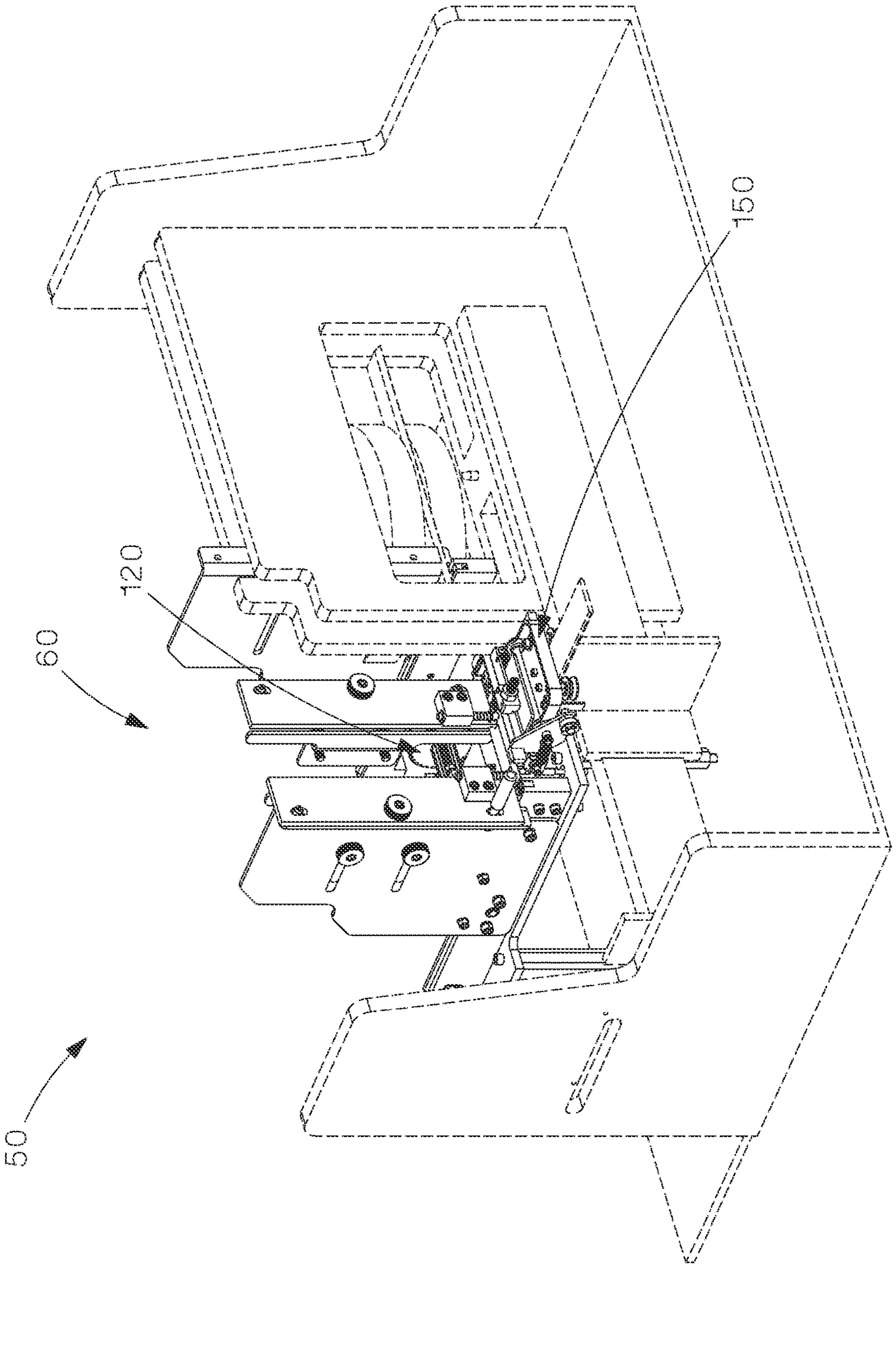
FIG. 1 is a partial perspective view of the embossing system of the present invention.
Figure 2:
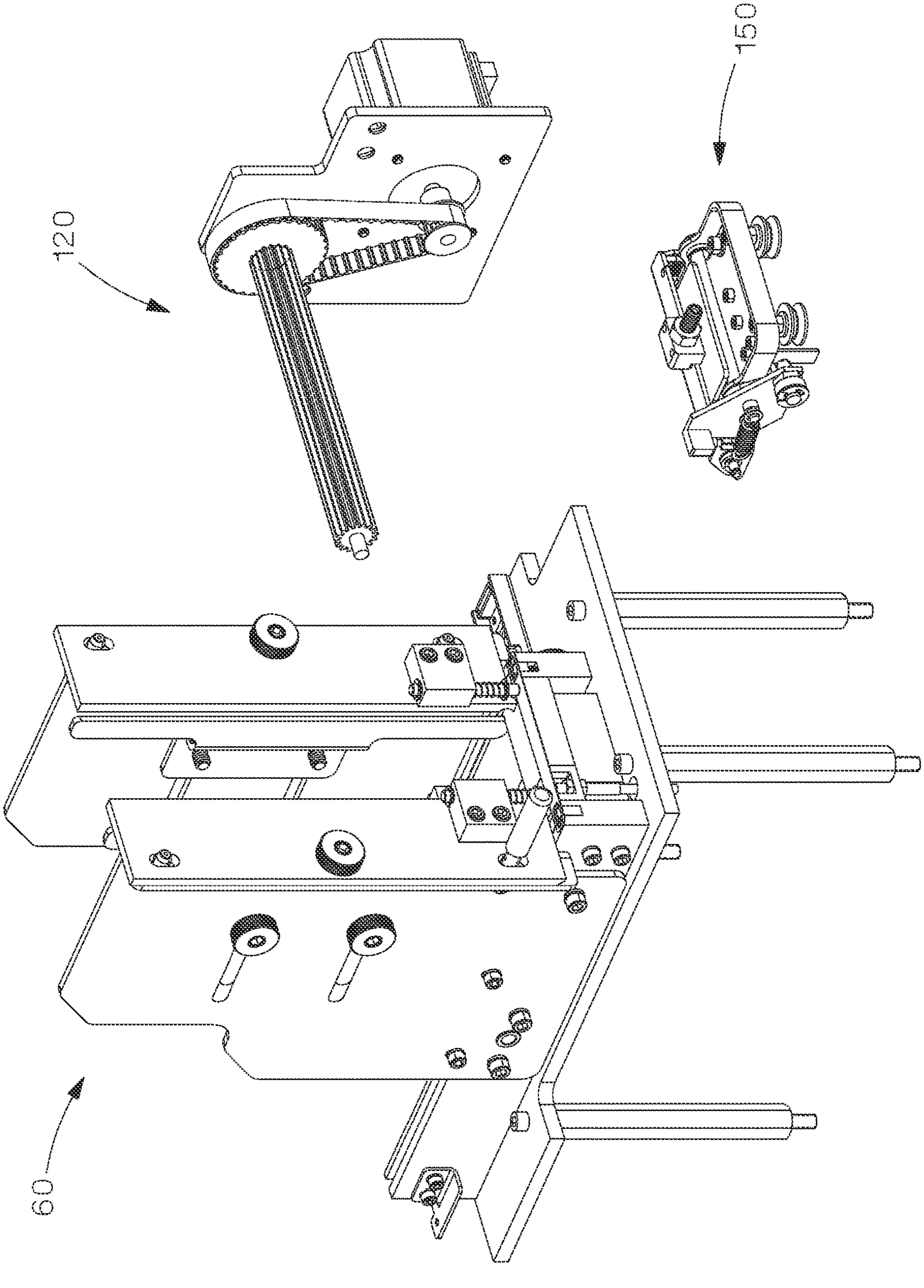
FIG. 2 is a partial exploded view of the feeder system and gripper system of the embossing system of FIG. 1.
Figure 3:
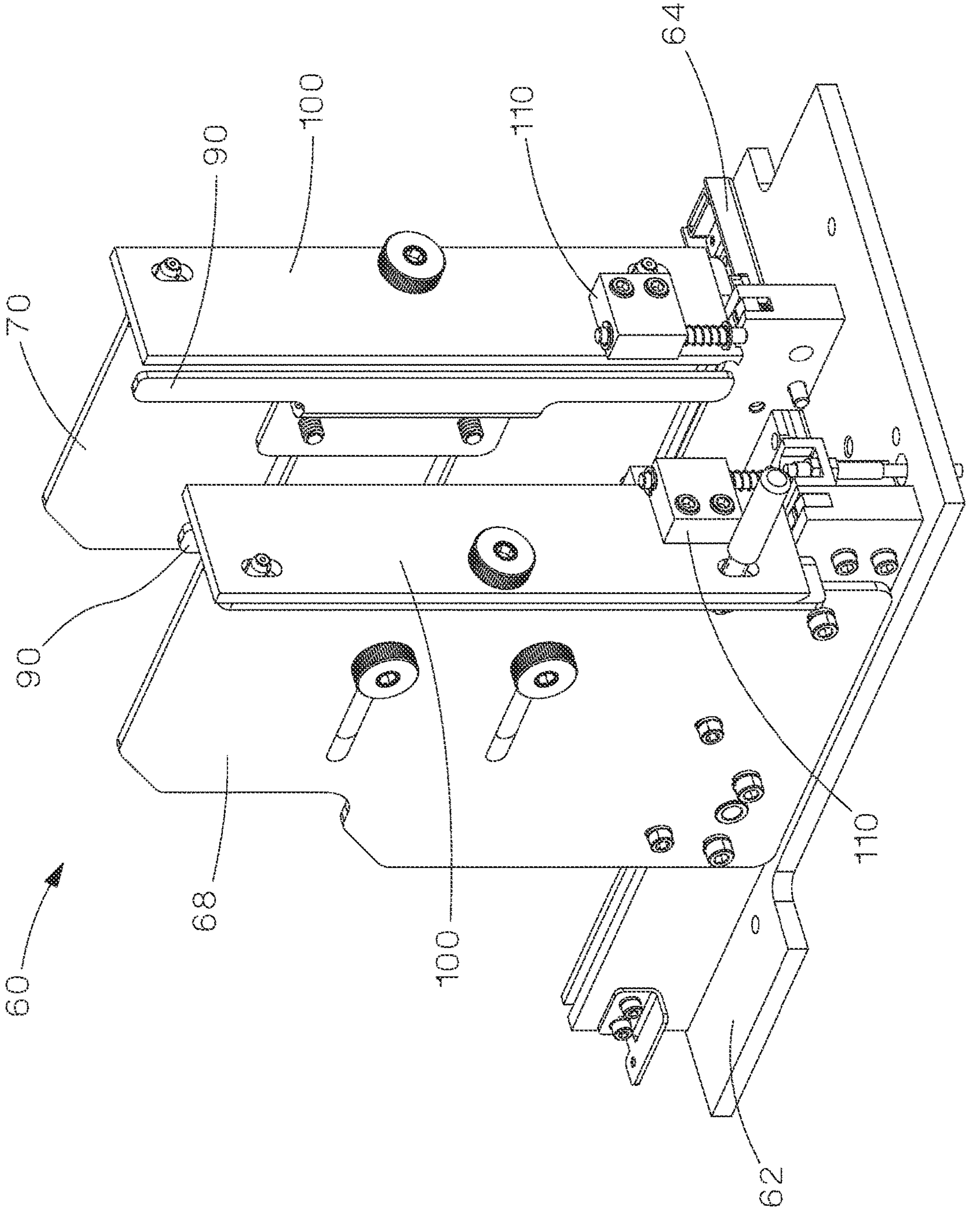
FIG. 3 is a perspective view of the feeder system of FIG. 1.
Figure 4:
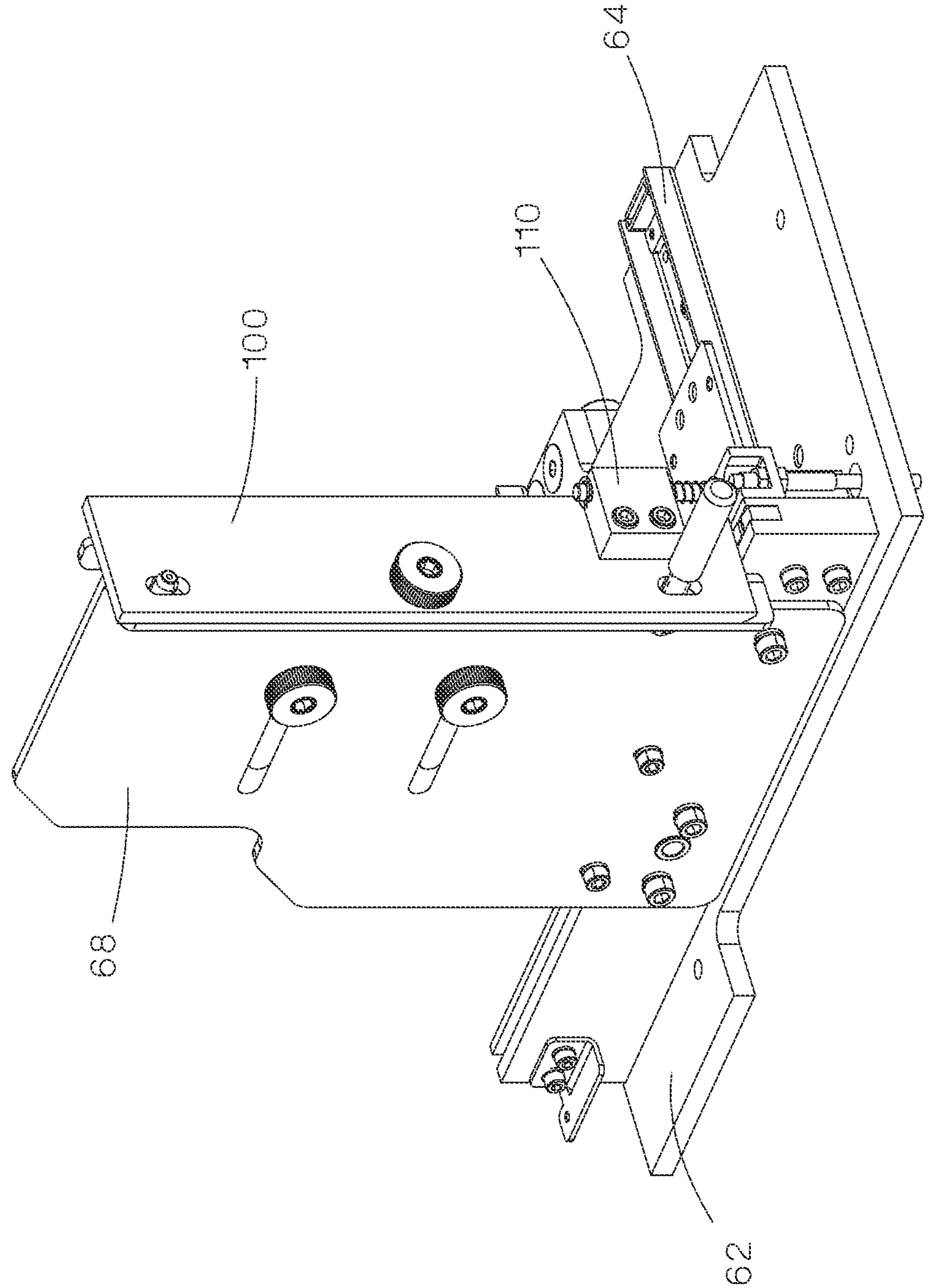
FIG. 4 is a perspective view of the feeder system of FIG. 3 with the moveable side wall removed.
Figure 5:
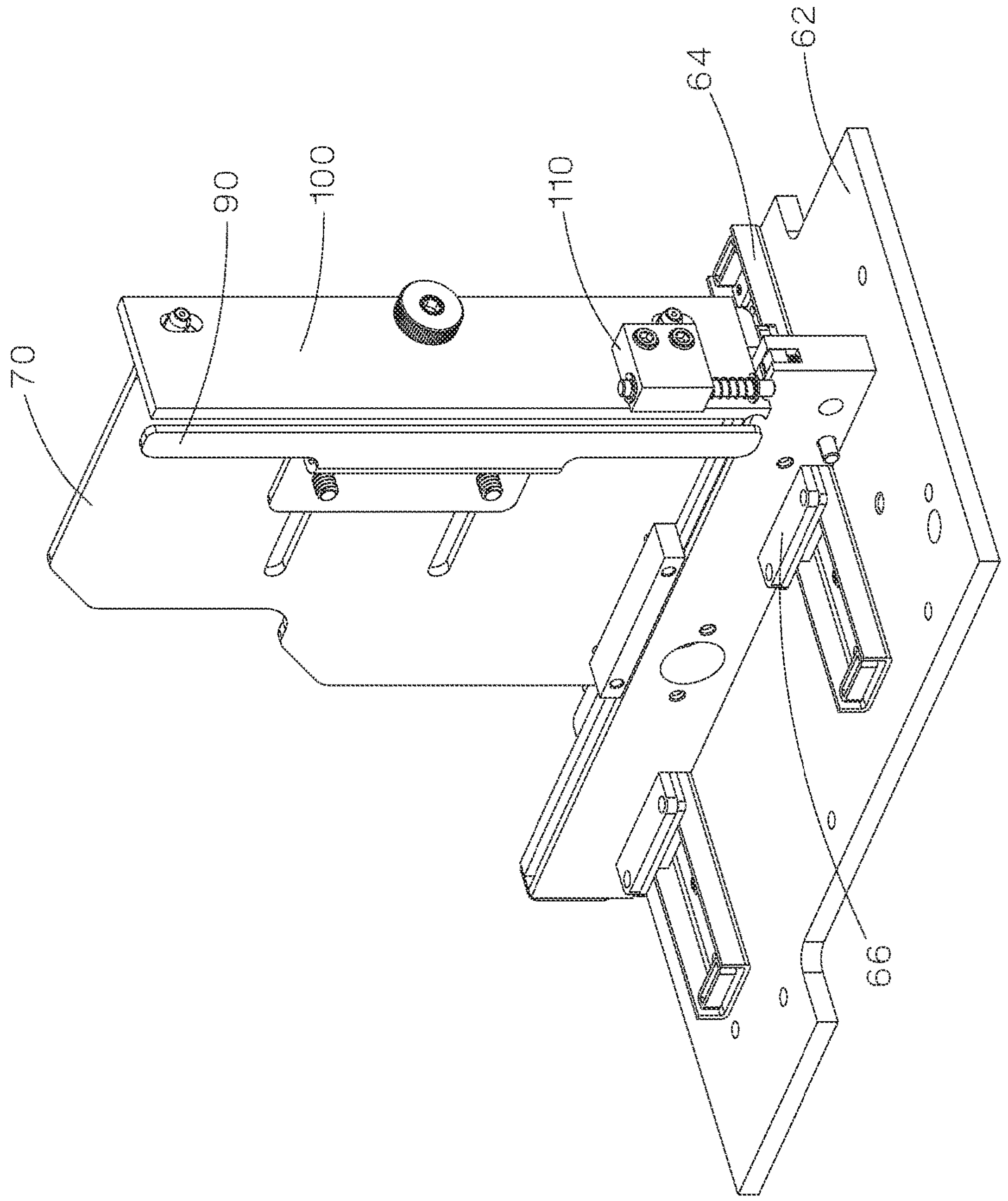
FIG. 5 is a perspective view of the feeder system of FIG. 3 with the fixed side wall removed.
Figure 6:
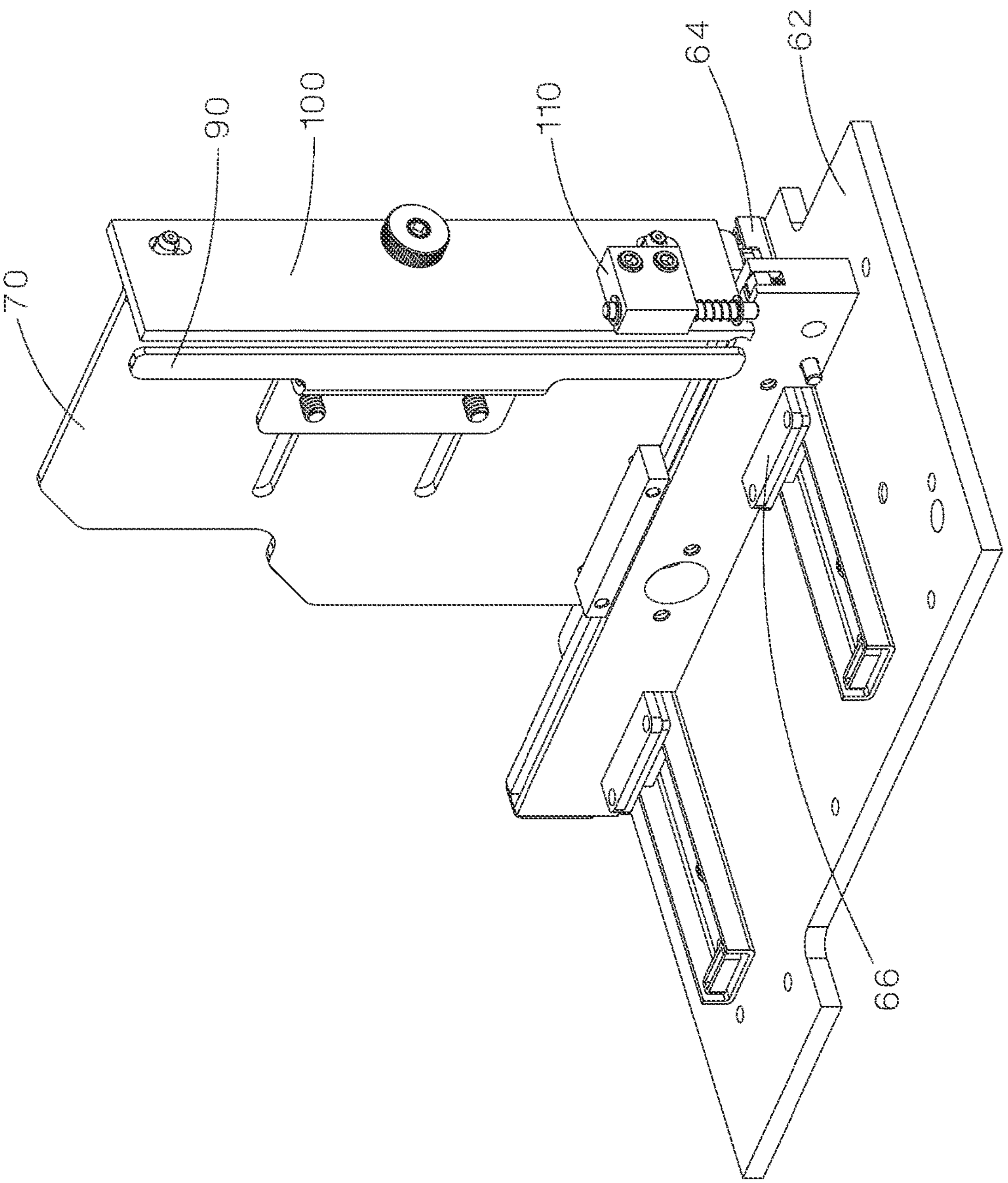
FIG. 6 is a perspective view of feeder system of FIG. 3 with the fixed side wall removed and the moveable side wall positioned for large marker plates.
Figure 7:
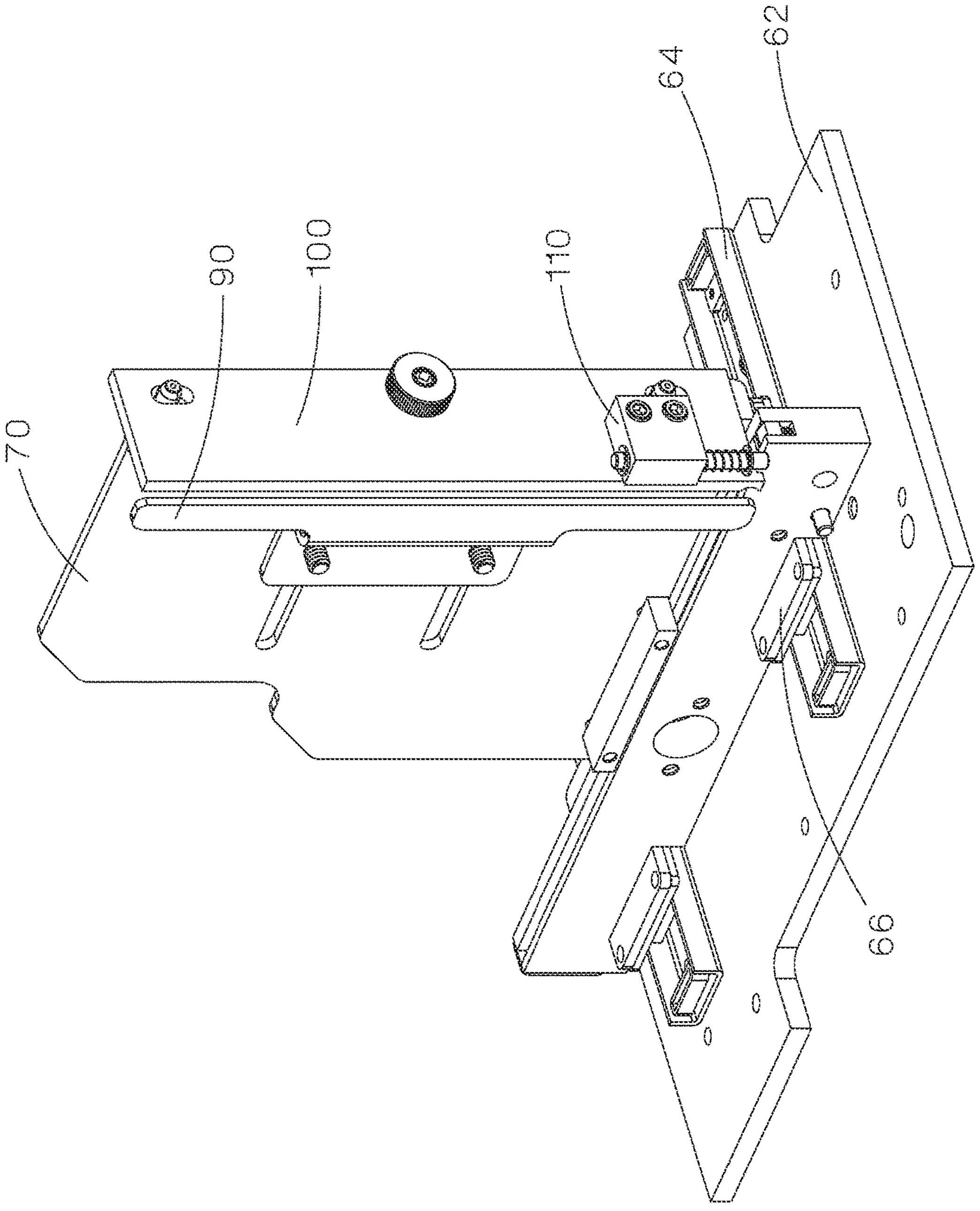
FIG. 7 is a perspective view of the feeder system of FIG. 3 with the fixed side wall removed and the moveable side wall positioned for smaller marker plates.

FIG. 1 illustrates an outline of the embossing system 50 with the improved feeder system 60 and the improved gripper system 150 of the present invention. FIG. 2 illustrates the improved feeder system 60, the drive sub-assembly 120, and the gripper system 150 removed from the housing of the embossing system 50.

FIGS. 3-10 illustrate the feeder system 60 of the present invention. The feeder system 60 is built onto a ¼ inch thick steel base plate 62. The base plate 62 provides a flatter mounting surface to allow for more precise operation of the installed components.

The feeder system 60 includes a fixed side wall 68, a moveable side wall 70, a marker plate height guide 90, adjustable feed gates 100, and plate hold down assemblies 110. The fixed side wall 68 and the moveable side wall 70 are constructed from a heavy gage steel. As a result, the side walls 68, 70 are more rigid than side walls of prior feeder systems and the improved side walls do not require any additional support. The rigid side walls enable the marker plates to be loaded without any interference thereby improving the efficiency of the machine.

Guide tracks 64 are installed on the base plate 62. The fixed side wall 68 is also installed on the base plate 62. The guide tracks 64 include roller ball guide blocks 66. The moveable side wall 70 is installed on the roller ball guide blocks 66. The movable side wall 70 is guided by the pair of precision rollerball guide blocks 66 to ensure that the movable side wall 70 stays parallel to the fixed side wall 68.

Figure 8:
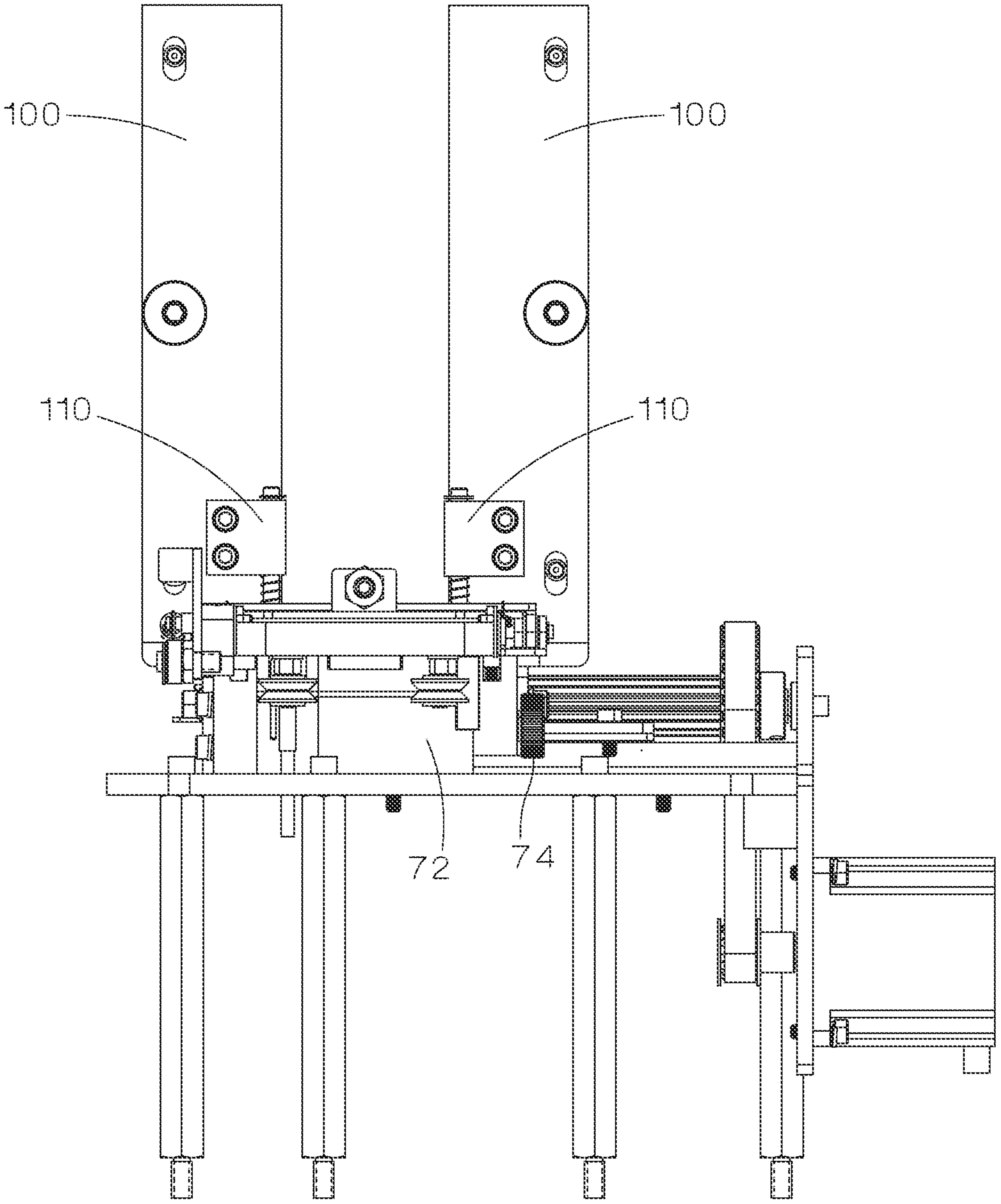
FIG. 8 is a front view of the feeder system of FIG. 1 positioned for large marker plates.
Figure 9:
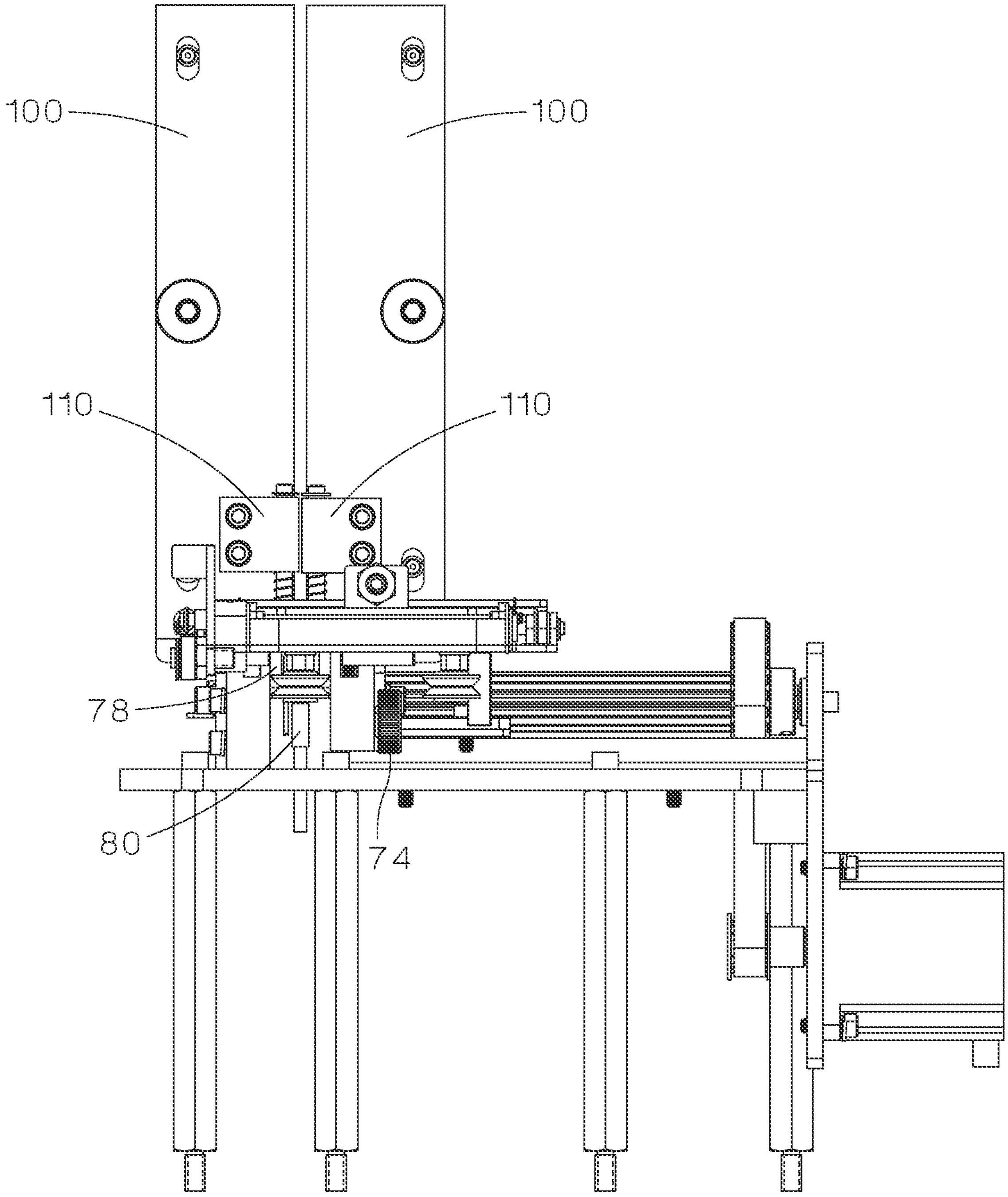
FIG. 9 is a front view of the feeder system of FIG. 1 positioned for smaller marker plates.
Figure 10:
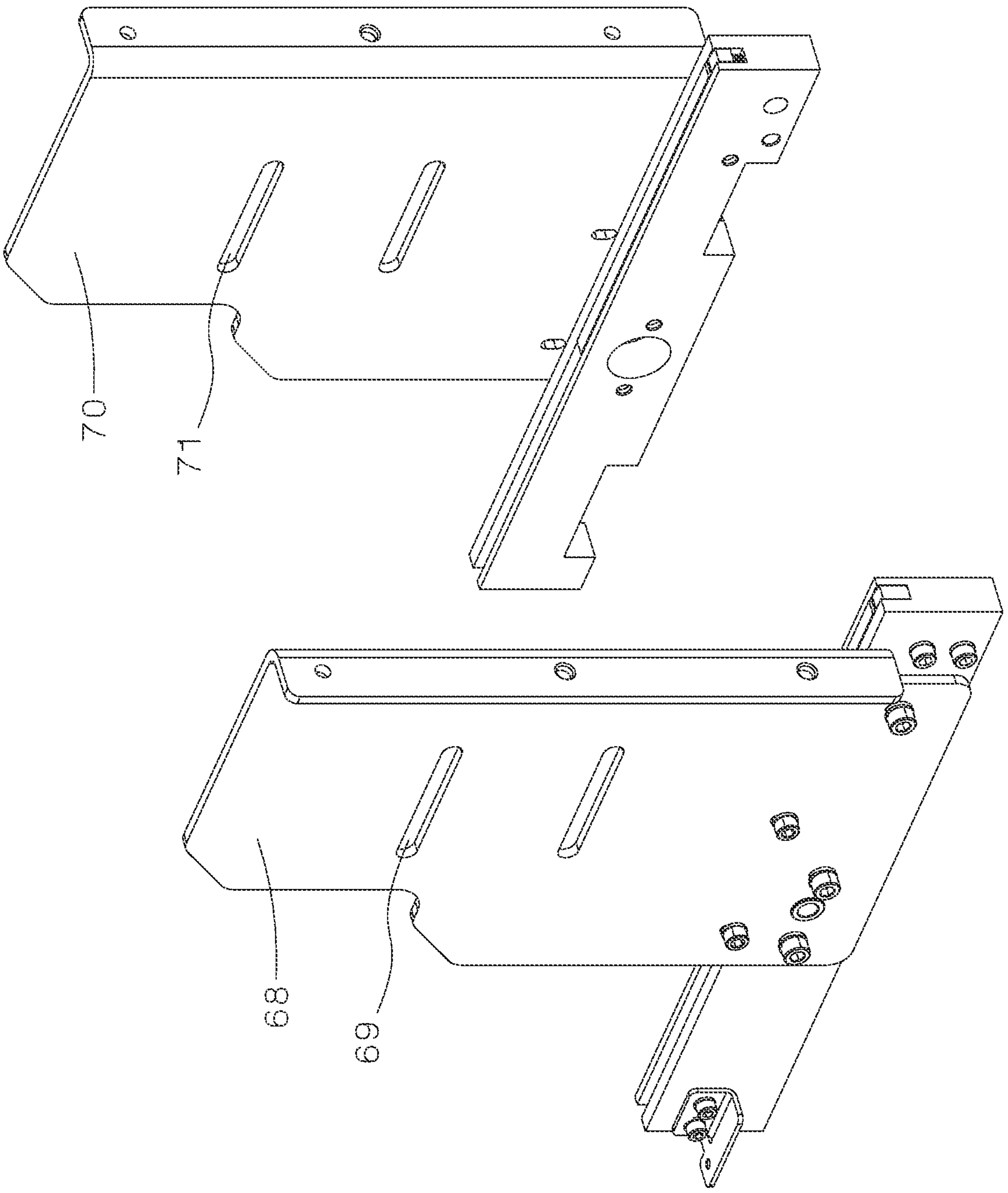
FIG. 10 is a perspective view of the fixed and moveable side walls and the push rod tracks of the feeder system of FIG. 3.

The feeder system 60 accommodates two marker plate widths. As illustrated in FIG. 8, the moveable side wall 70 is positioned in the wide position. An aluminum spacer block 72 is installed to accommodate a 3.50" wide marker plate. As illustrated in FIG. 9, the movable side wall 70 is positioned in the narrow position. In the narrow position, the spacer block 72 is removed to accommodate a 1.72" wide marker plate. The spacer block 72 is removed by loosening the locking thumb screw 74 on the right side of the feeder system 60 and sliding the moveable side wall 70 to the right. The second locking thumb screw (not illustrated) on the back of the spacer block 72 is removed in order to remove the spacer block 72. Once the spacer block 72 is removed, the moveable side wall 70 can slide to the left towards the fixed side wall 68 narrowing the opening between the side walls 68, 70. The locking thumb screw 74 is replaced to the hold the moveable side wall 70 in place.

The feeder system 60 also includes a permanent spacer block 78 that contains a proximity sensor 80. The proximity sensor 80 senses the presence of the marker plate. The proximity sensor was moved to within the permanent spacer block 78 to protect the sensor from damage.

Figure 11:
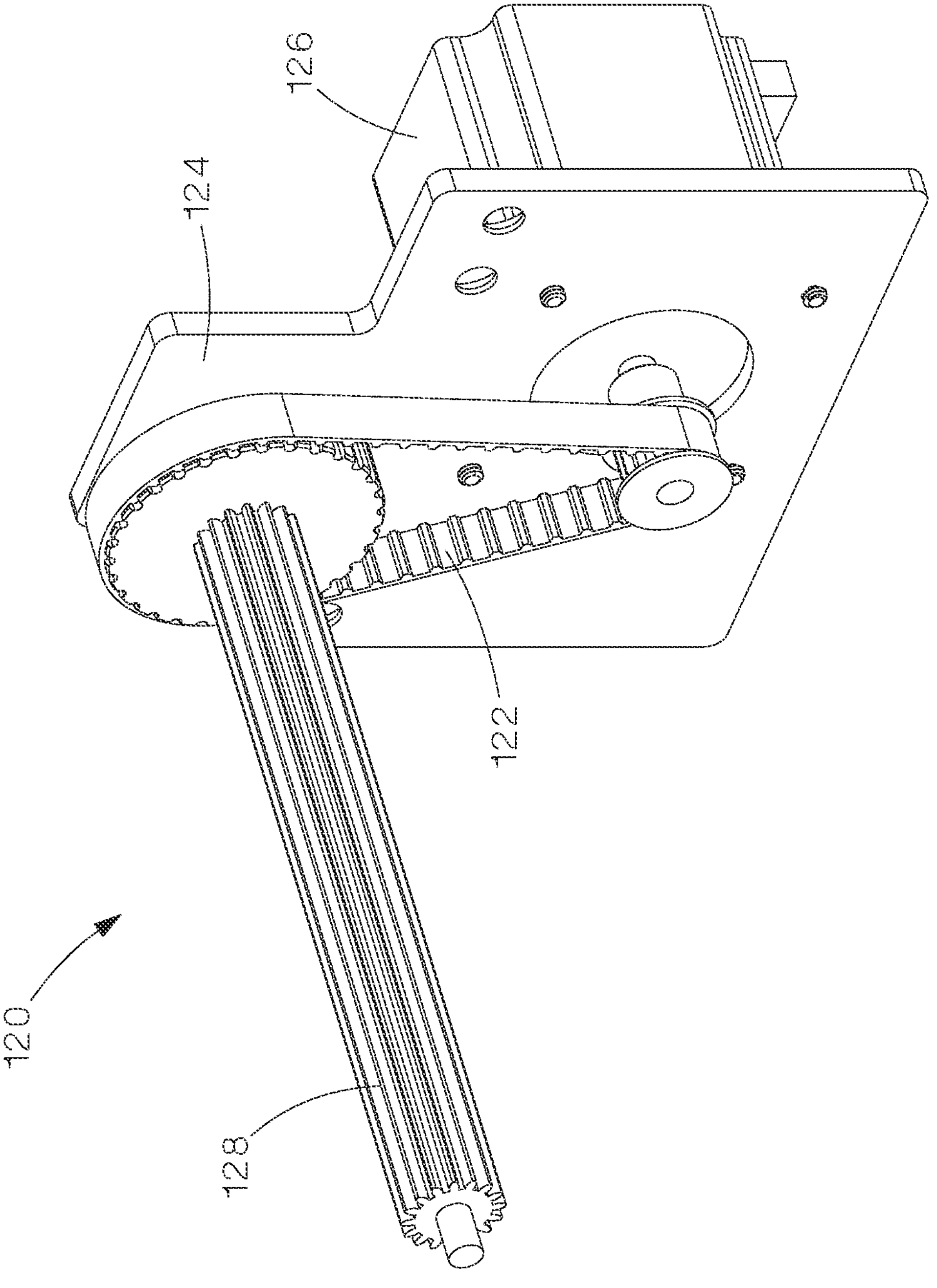
FIG. 11 is a perspective view of the drive sub-assembly that attaches to the feeder system of the embossing system of FIG. 1.

Drive components are pre-assembled into the drive sub-assembly 120. FIG. 11 illustrates the drive sub-assembly 120. The components are functionally checked prior to attaching the drive sub-assembly 120 into the feeder system. The drive sub-assembly 120 includes a drive belt 122, a mounting plate 124, a stepper motor 126, and a drive gear 128. The drive belt 122 spacing is controlled by the accuracy of a single machined mounting plate 124. The stepper motor 126 is accurately positioned on the mounting plate 124 using the stepper motor's close tolerance pilot, preventing shifting during operation. The drive gear 128 is positioned by a bronze bushing which is pressed into the mounting plate 124. The drive sub-assembly 120 is easily attached to the feeder system 60 with a plurality of screws.

Figure 12:
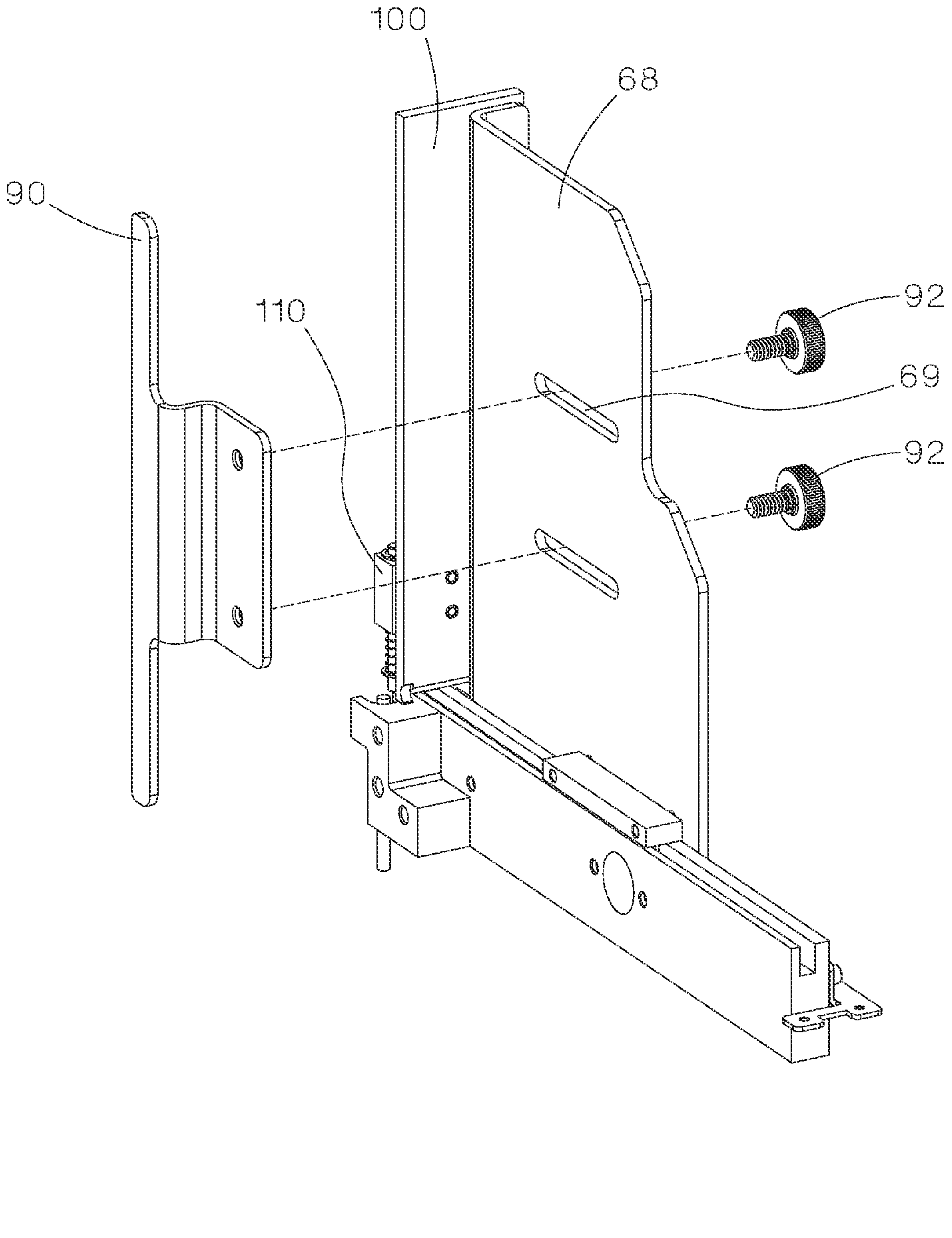
FIG. 12 is a perspective exploded view of the marker plate height guide assembly of the feeder system of FIG. 3.

As illustrated in FIG. 12, the marker plate height guide assembly 90 is secured to the fixed side wall 68 via locking thumb screws 92. A marker plate height guide assembly 90 is also secured to the moveable side wall 70 via locking thumb screws 92 (see FIGS. 3 and 13). The marker plate height guide assembly 90 provides a positive support for the stack of marker plates within the feeder system 60. The adjustment range accounts for a variety of sizes of marker plates. For example, when the marker plate height guide assembly 90 is slid to the forward most position in the side wall slots 69, 71 of the fixed side wall 68 and the moveable side wall 70, respectively, a ⅜ inch tall marker plate is supported. If the marker plate height guide assembly 90 is slid to the rear most position in the side wall slots 69, 71, the 2.12 inch high marker plate is accommodated. The feeder system 60 can also accommodate heights in between with the use of a spacer block (not illustrated).

Figure 13:
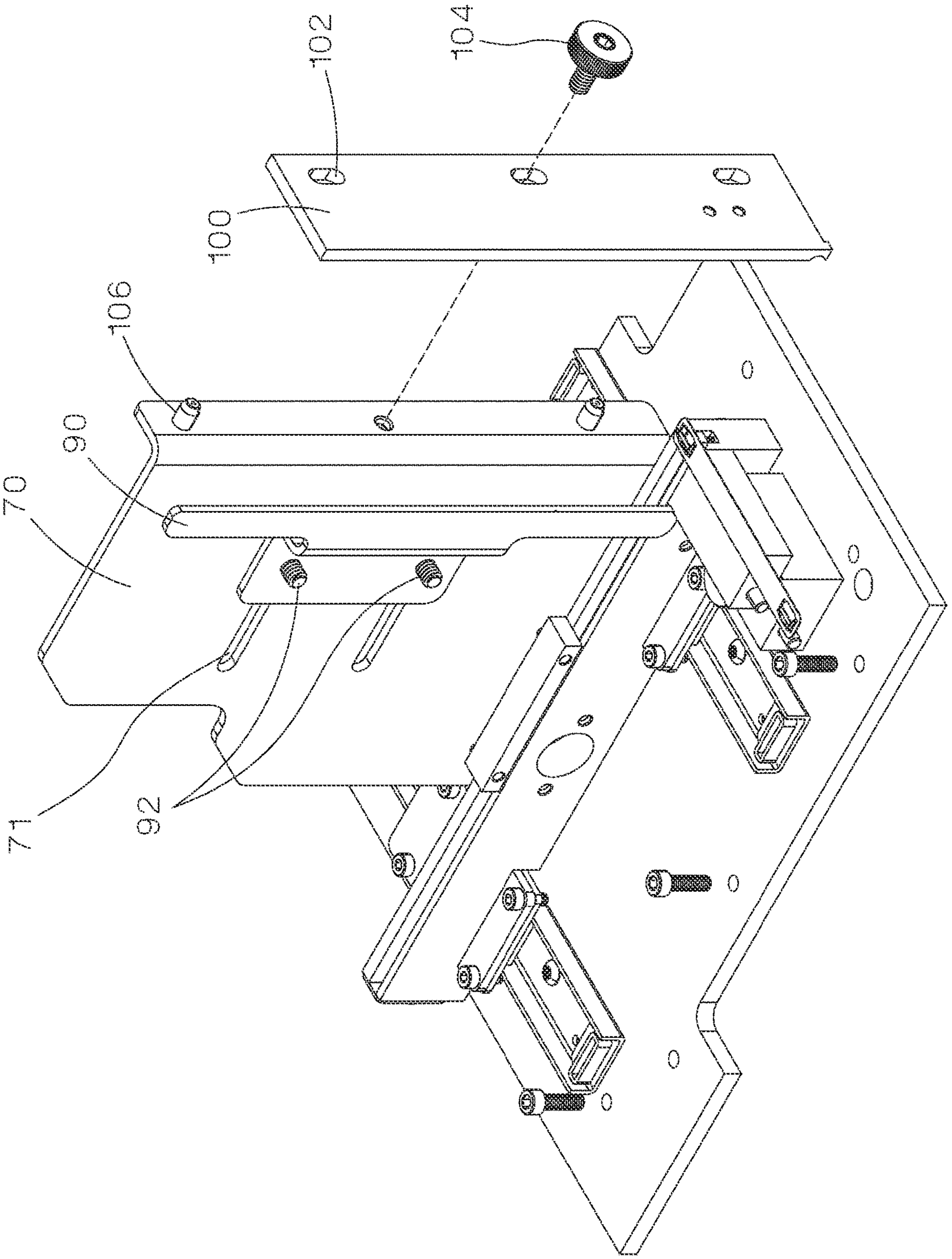
FIG. 13 is a perspective exploded view of the marker plate thickness gate of the feeder system of FIG. 3.

The feeder system 60 of the present invention also accommodates thickness adjustments if needed for the various thicknesses of the marker plates available. As illustrated in FIG. 13, a vertical adjustable gate 100 is secured to the side walls 68, 70. The vertical adjustable gate 100 includes two precision machined guide slots 102. The guide slots 102 receive the precision ground dowel pins 106 that are pressed into the side walls 68, 70. This ensures that the motion of the marker plate is only vertical. A feeler gauge (not illustrated) is placed under the gate 100 to enable the optimal gate clearance for a given marker plate thickness. Once the desired gate clearance is achieved, the locking thumb screw 104 is tightened to hold the gate 100 in place. The feeler gauge may be removed once the gate 100 has been secured.

Figure 14:
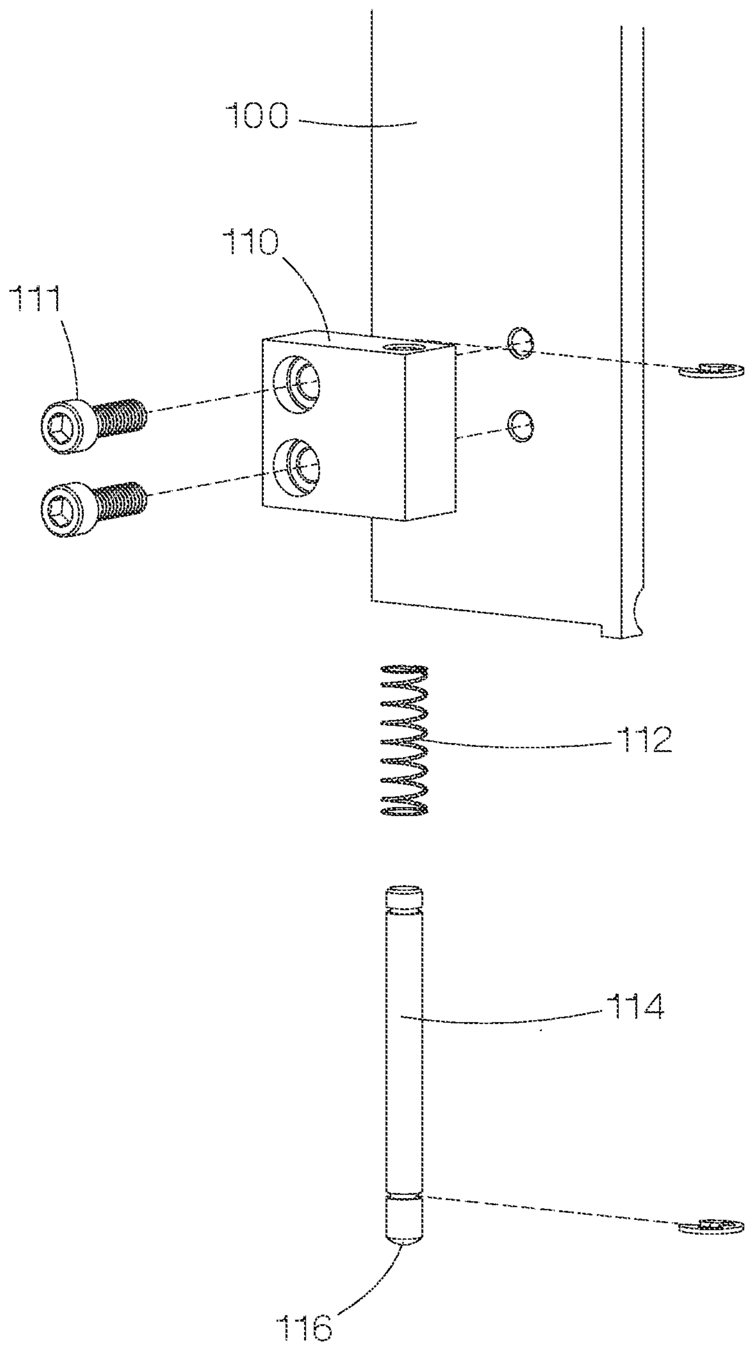
FIG. 14 is a perspective exploded view of the marker plate hold down assembly of the feeder system of FIG. 3.
Figure 15:
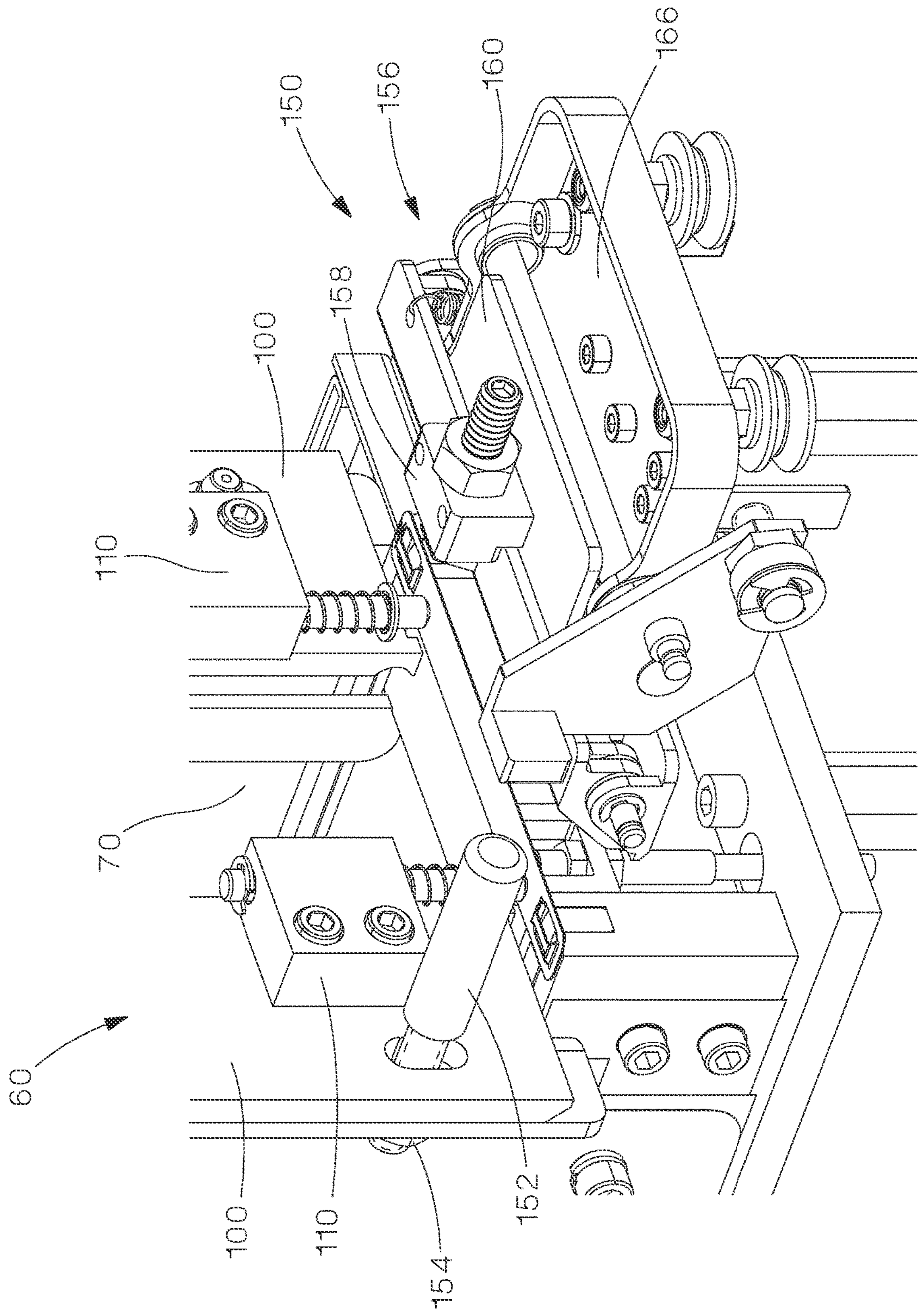
FIG. 15 is a perspective view of the gripper system secured to feeder system of FIG. 3.
Figure 16:
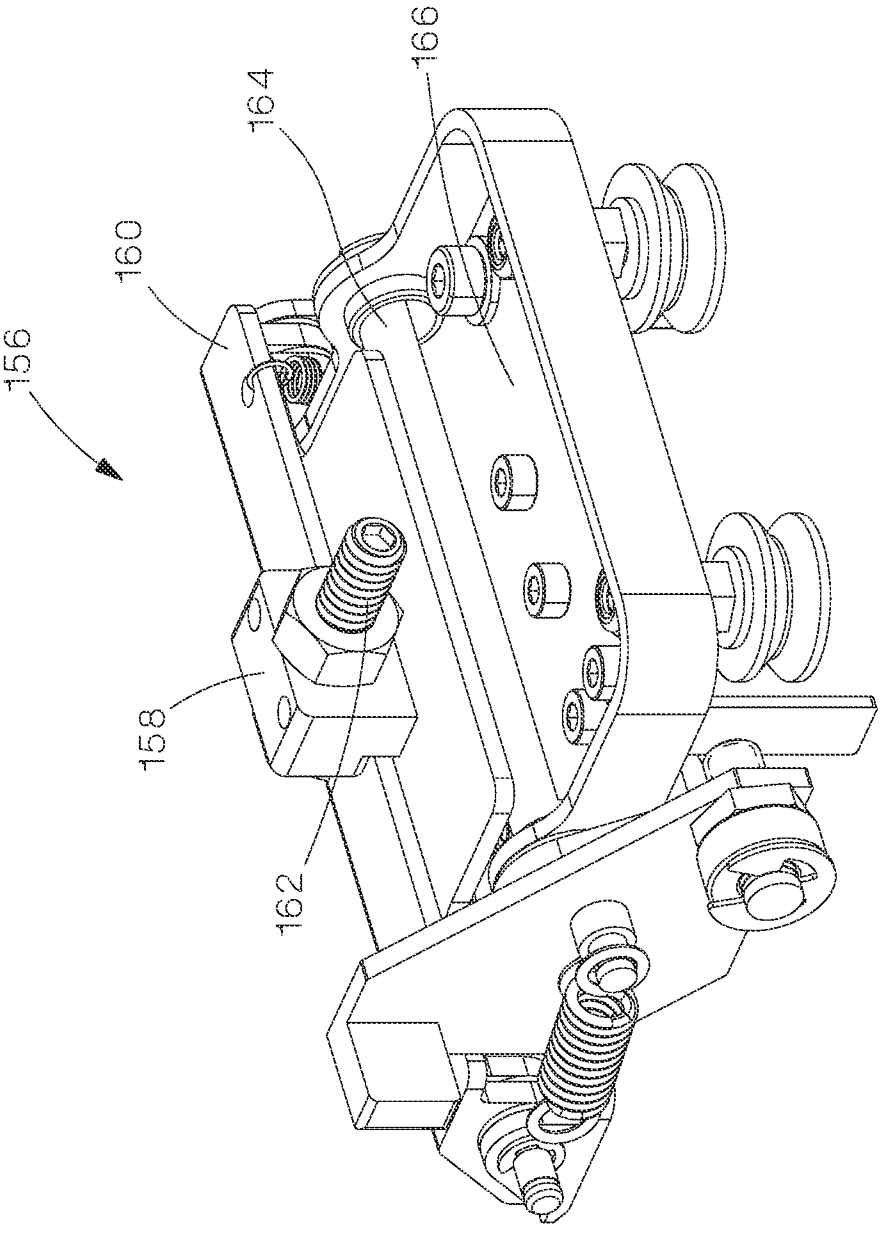
FIG. 16 is a left side perspective view of the gripper system of FIG. 15.
Figure 17:
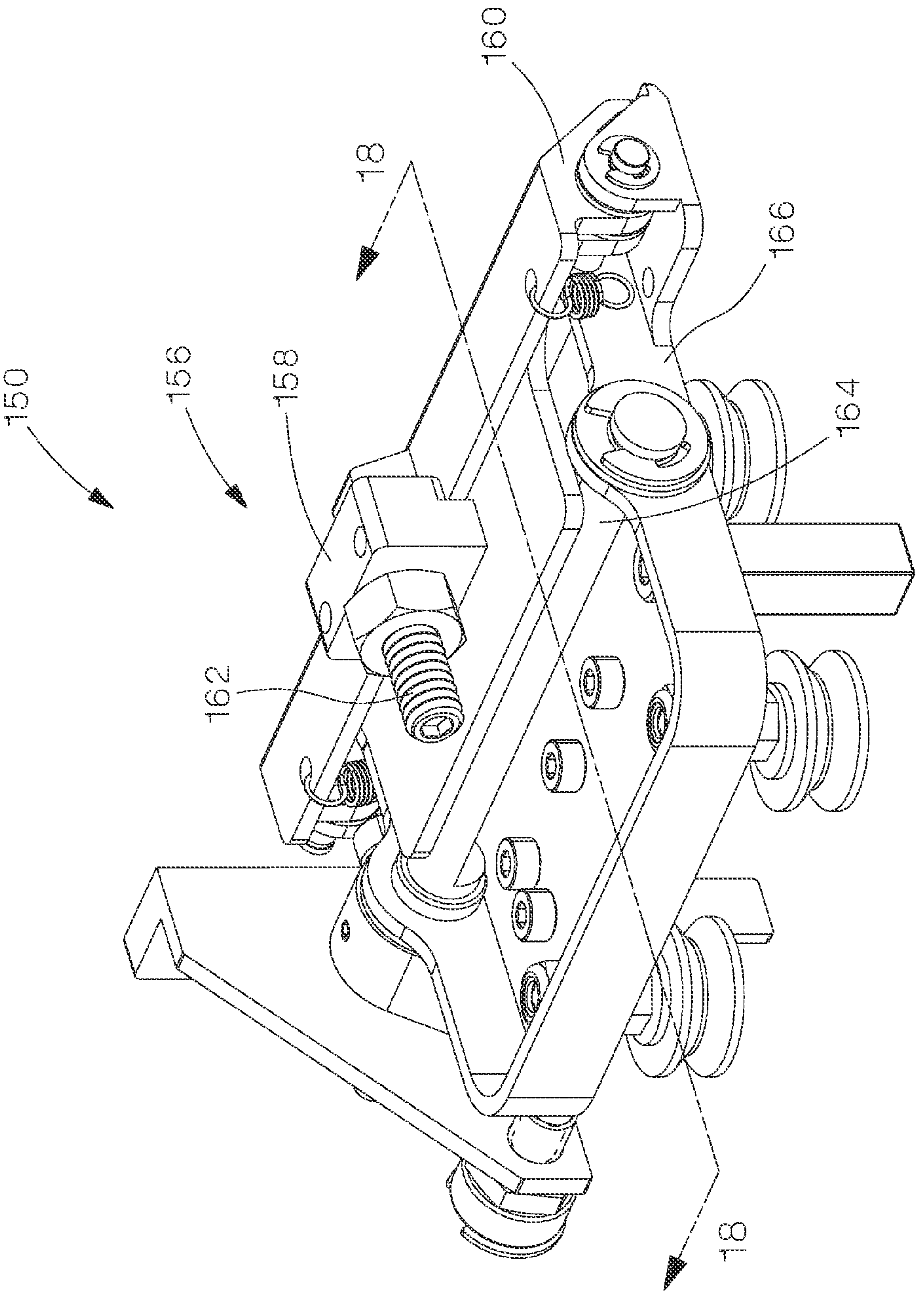
FIG. 17 is a right side perspective view of the gripper system of FIG. 15.

Some marker plates are not tall enough to be supported by their plate stack once they are pushed into position. To prevent the marker plates from moving while they wait to be gripped by the gripper system, a spring-loaded plate hold down assemblies 110 is secured to each gate 100 by fasteners 111. FIG. 14 illustrates one of the plate hold down assemblies 110. A compression spring 112 applies a downward force to the stainless-steel hold down rod 114 which prevents machine vibrations and gripper misalignment from leading to misfeeds and embossment errors. The tip 116 of the hold down rod 114 has a spherical shape and a polished surface to prevent plate scratches. As the gates 100 are adjusted to the desired height, so is the attached hold down assembly 110. As a result, the identical hold down pressure will be exerted on all plates.

The gripper system 150 is illustrated in FIGS. 15-18. As the gripper system 150 approaches the feeder system 60, a trigger is required to close the gripper jaws at the correct moment so that the gripper jaws grab the marker plate securely. A gripper trigger rod 152 is positioned in the lower left-hand gate. The gripper trigger rod 152 can be adjusted in or out to time the trigger point to ensure that the marker plate is consistently grabbed securely by the gripper jaws. A jam nut 154 located on the backside of the left side wall provides a means of locking the trigger rod 152 into place.

Figure 18:
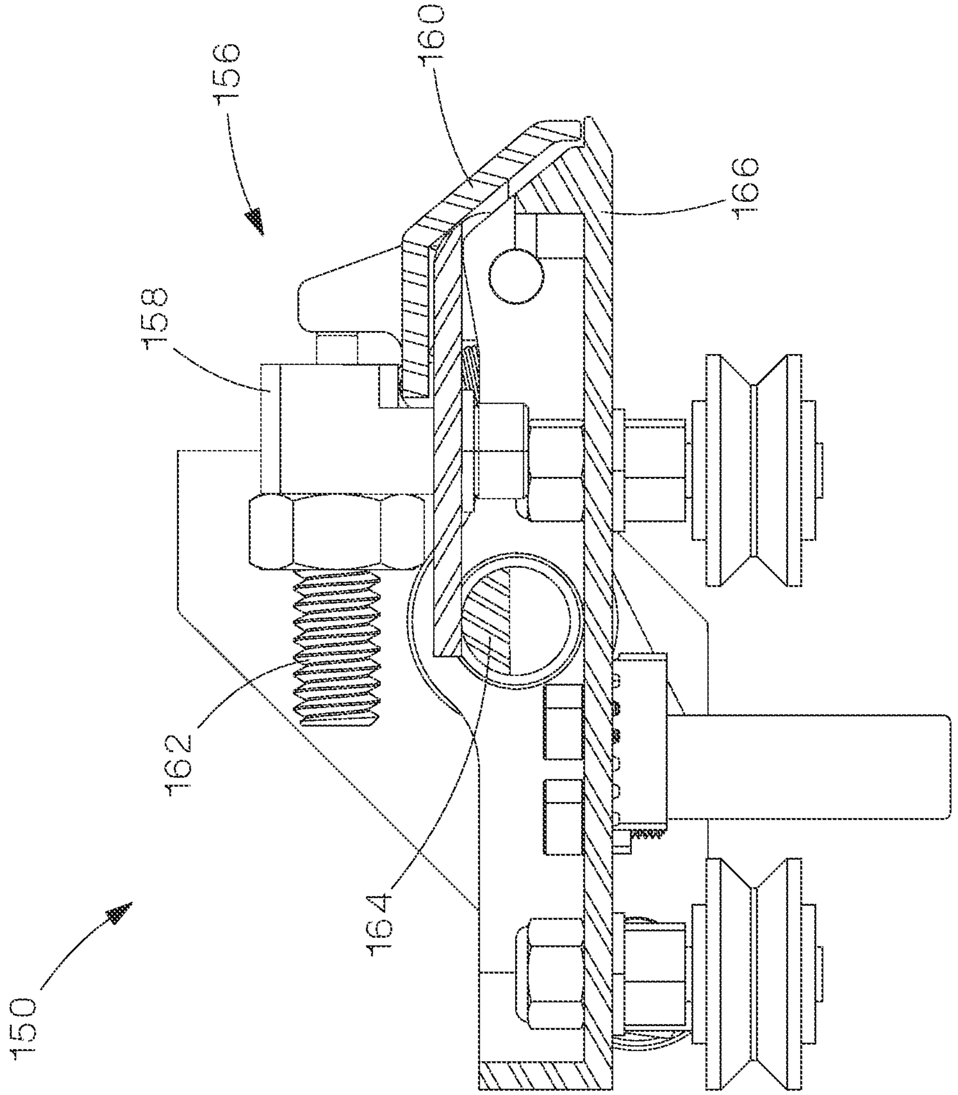
FIG. 18 is a cross sectional view of the gripper system taken along line 18-18 of FIG. 17.

The gripper clamp force control system illustrated in FIG. 18 utilizes a two-piece upper jaw assembly 156 with a spring-loaded ball detent 162. A rotating shaft 164 pushes up the inner jaw assembly 158, which then applies a force to the outer jaw 160 via the ball detent 162. When the gripper is in the closed positioned, the pressure on the marker plate can be increased or decreased by rotating the ball detent 162 clockwise or counterclockwise, respectively. The appropriate pressure will prevent damaging the marker plate or allowing the marker plate movement during embossment. With the precision machined base 166 and upper jaw assembly 156, the contact pressure will be evenly distributed across the entire width of the marker plate. Therefore, every size marker plate will be securely gripped and presented accurately to the embossment unit.

As discussed above, the embossing system of the present invention provides an improved feeder system and an improved gripper system. The feeder system of the present invention provides a more accurate track system to accommodate varying plate widths, a stable plate height guide to prevent plate stack from sticking or falling, an improved stiffness in the frame to ensure that adjustments are secure, and a more precise thickness control to prevent misfeed, skewing or jamming. The embossing system also provides ease of initial assembly and ease of operator adjustment, when necessary.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. An embossing system for marking metal marker plates, the embossing system comprising:

a feeder system for presenting a marker plate, wherein the feeder system has a fixed side wall secured to a base plate, a moveable side wall positioned on guide tracks secured to the base plate a distance from the fixed side wall and extending parallel to the fixed side wall, marker plate guides secured to the fixed side wall and the movable side wall, and adjustable feed gates secured to the fixed side wall and the moveable side wall;

a drive sub assembly secured to the feeder system; and a gripper system for gripping the marker plate from the feeder system;

whereby the moveable side wall, marker plate guide secured to the moveable side wall, and the adjustable feed gate secured to the moveable side wall move together on the guide tracks.

2. The embossing system of claim 1, wherein the drive sub assembly includes a drive belt, a mounting plate, a stepper motor, and a drive gear.

3. The embossing system of claim 1, wherein the gripper system includes a two-piece jaw assembly with a spring loaded ball detent.

4. The embossing system of claim 3, further comprising a gripper trigger rod secured to a feed gate of the feeder system, wherein the gripper trigger rod ensures the marker plate is consistently grabbed by the jaw assembly of the gripper system.

5. The embossing system of claim 1, wherein the guide tracks include guide blocks; wherein the moveable side wall is installed on the guide blocks and is guided by the guide blocks ensuring the movable side wall remains parallel to the fixed side wall.

6. The embossing system of claim 1, wherein the fixed side wall and the moveable side wall have horizontal side wall slots; wherein adjustment of the marker plate guides within the side wall slots accommodates a variety of marker plate heights.

7. The embossing system of claim 1, wherein the adjustable feed gates have vertical guide slots to accommodate adjustments for maker plate thickness variations.

8. The embossing system of claim 7, further comprising plate hold down assemblies secured to the adjustable feed gate for preventing the marker plates from moving while waiting to be gripped by the gripper system.

9. The embossing system of claim 8, wherein the plate hold down assemblies include a compression spring and a hold down rod for preventing marker misfeeds and embossing error; wherein the hold down rod having a tip with a spherical shape and a polished surface for preventing marker plates from being scratched.

* * * * *